Jan. 31, 1961 M. E. LASSER ET AL 2,970,285

INFRA-RED DETECTOR ELEMENTS AND METHODS OF MAKING SAME

Filed Aug. 13, 1957

INVENTORS
PHILIP H. CHOLET
MARVIN E. LASSER
BY
Fordyce A. Bothwell
ATTORNEY

United States Patent Office 2,970,285
Patented Jan. 31, 1961

2,970,285

INFRA-RED DETECTOR ELEMENTS AND METHODS OF MAKING SAME

Marvin E. Lasser, Elkins Park, and Philip H. Cholet, Levittown, Pa., assignors to Philco Corporation, Philadelphia, Pa., a corporation of Pennsylvania Filed Aug. 13, 1957, Ser. No. 678,758

12 Claims. (Cl. 338—18)

This invention relates to improvements in structure and methods of making infra-red detector devices which employ a suitably doped semiconductor detector element and lead wires connected thereto. Such a detector element is conventionally fabricated by cutting a blank of the doped semiconductor, establishing electrodes thereon, and connecting lead wires to the electrodes as by soldering. The detector element is then enclosed within a suitable envelope which may be composed of glass.

While the invention is intended to be applicable to any such device, it is preferably applied to germanium infra-red detectors and it will be described with particular reference thereto.

Infra-red detector cells are now well known. An example of such a detector is that employing gold-doped germanium, as described for example in Physical Review, volume 100, No. 6 (December 15, 1955), beginning at page 1629. The characteristics of such a detector cell are such that it must be operated at extremely low temperature. For this reason, the detector cell is usually mounted in a form of Dewar flask containing liquid nitrogen.

Heretofore, a major problem has existed with respect to protection of the detector element against contamination by exposure to the atmosphere both during storage and during use of the cell. The practice in the past has been to maintain a protective high vacuum within the cell envelope about the detector element, but this has been difficult and it has not provided a satisfactory solution of the problem.

In this connection, it should be noted that the detector element should have high surface resistance, and surface contamination may reduce the surface resistance to such an extent as effectively to short-circuit the element. Moreover, the detector element is extremely vulnerable to surface contamination. In prior use of a protective high vacuum, any material diminution of the vacuum resulted in loss of protection and consequent exposure to contamination.

One object of the present invention is to provide a satisfactory solution of the aforementioned problem.

Another object of the invention is to provide an improved infra-red detector which has its own built-in protection against surface contamination and which has other important advantages as hereinafter set forth.

Another object of the invention is to provide a method of making the detector which further insures its protection against surface contamination.

Still another object of the invention is to provide a novel detector-amplifier unit which has additional advantages.

Figure 1:
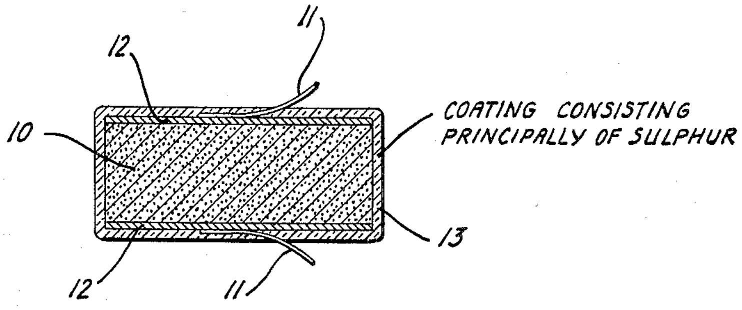
Figure 2:
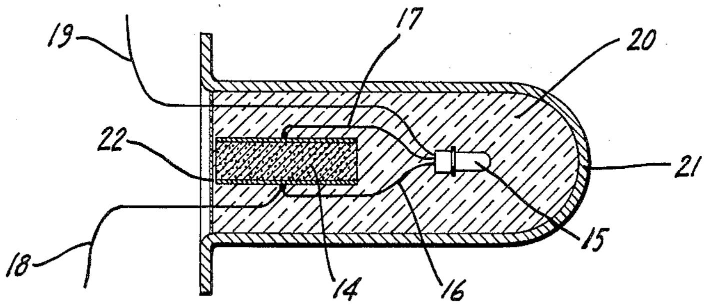

With the foregoing in mind, the invention may be fully understood from the following detailed description with reference to the accompanying drawing wherein Fig. 1 is a sectional view of an infra-red detector element embodying the present invention; and Fig. 2 is a similar view of a combined detector-amplifier unit according to this invention.

It has been proposed heretofore to encase or enclose various types of photoelectric devices within transparent materials. However, as far as known, prior to the present invention there has been no satisfactory protective encasement or enclosure of an infra-red detector element comprising a semiconductor body such as doped germanium. Apparently no one succeeded in providing an encasement which not only would serve as an efficient infra-red-transparent protective medium but would not deleteriously affect the semiconductor body.

We have discovered that sulphur is an excellent material for this purpose, apparently due to its crystalline similarity to semiconductors and its inert characteristic. From experimentation and tests, we have found that the encapsulation of the infra-red detector element in a coating consisting principally of sulphur affords numerous advantages among which are the following:

(1) The sulphur surrounding the element acts as a thermal conductor and promotes uniformity of cooling to low operating temperatures, thereby reducing the tendency for the soldered connections to crack or rupture due to stresses produced by non-uniform cooling.

(2) The sulphur adds thermal mass to the detector element and thus reduces the rate of temperature change, which also helps to prevent rupture of the soldered connections.

(3) The sulphur is an electrical insulator and it serves as an insulating support for the lead connections, resisting physical displacement thereof.

(4) The sulphur is transparent to infra-red radiation and therefore it serves as a window through which the detector element is activated.

(5) The sulphur is mechanically stable and it provides excellent protection against atmospheric contamination, permitting storage of the detector element or the complete cell in the atmosphere for long periods of time.

(6) The sulphur has no adverse effect upon the surface properties of the semiconductor body.

(7) The sulphur has a positive beneficial effect on the surface of the detector element, rather than merely acting as an inert protective coating. We have found that if a detector is not highly sensitive immediately after it is assembled, in the absence of sulphur encapsulation it will not improve, but if it is encapsulated in sulphur its sensitivity will increase after a few weeks of storage and it will retain its increased sensitivity.

The sulphur encapsulation of an infra-red detector element, according to the present invention, eliminates the need for the previously-employed vacuum about the element insofar as protection against contamination is concerned. However, in any case it is necessary to prevent frosting of the cell, and while a vacuum may be employed for this purpose, the vacuum requirement is much less than for protection against contamination. Moreover, the vacuum may be eliminated completely if the detector is to be used in a dry ambient or if some other provision is made for prevention of frosting.

The material used in the detector element preferably consists of germanium provided with compensated doping. The preferred dopants are gold and antimony. Antimony is basically a donor material and the proportions are adjusted to compensate for the two acceptor levels introduced by gold. When properly compensated, the room temperature resistivity is in the range of two to four ohm centimeters, and it has been found that the carrier mobility increases as temperature is reduced, and this effect becomes increasingly apparent down to around 77° K. The increase in mobility is accompanied by an increase of resistance on the order of 4 to 5 decades. The manufactured cell may show a terminal resistance of a few hundred ohms at room temperature, with this value rising to on the order of megohms at liquid nitrogen temperature.

The present invention does not require any change or modification of the construction of the detector element itself, since the sulphur encapsulation is performed after completion of the element. Moreover, the sulphur may be applied to the completed element in any suitable manner, as by dipping or casting. However, to insure against contamination the sulphur should be applied as soon as the detector element is completed. Preferably, the sulphur is applied by dipping the detector element into the sulphur with the latter at elevated temperature, e.g. about 140° C. At this temperature, the sulphur is in liquid phase and when the element is withdrawn a thin coating of sulphur adheres to it.

We have found that protection of the detector element against contamination is further insured if, just prior to the application of the sulphur, the element is immersed in carbon tetrachloride. The preferred procedure, following the conventional fabrication of the detector element, is to etch the element to achieve the desired surface conditions, then wash it in de-ionized water to remove the etch and etch products, then rinse it in carbon tetrachloride to remove the water, and then immediately dip it into the liquid sulphur. As previously mentioned, the detector element is extremely vulnerable to surface contamination which tends to short-circuit it, and it has been found that the immersion in carbon tetrachloride effectively precludes contamination.

The sulphur employed according to this invention may be used alone or in combination with an additive. In some instances it may be desired to increase the rate of heat transfer through the encapsulating material, and this may be accomplished by the use of a suitable additive, such as boron carbide, which has high thermal conductivity and is inactive toward germanium. In successful experimental use, Norton #600-grit $B_4C$ was added to molten sulphur at 110° C. until the mixture became pasty, and the detector element was then placed in the paste. The encapsulated element was then heated to 95° C. to insure good contact of the sulphur paste with the element. Thereafter the element could be cooled rapidly to the temperature of liquid nitrogen.

The present invention also contemplates the use of heat treatment to increase the thermal conductivity of pure sulphur. Heat treatment of sulphur at temperatures above 95.5° C. produces monoclinic structure while heat treatment at lower temperatures produces rhombic structure which has greater thermal conductivity. In one successful experiment, a detector element encapsulated with pure sulphur was baked at 85° C. for six days. As a result of this treatment, which did not affect the sensitivity of the element, the time required to cool the element to operating temperature was reduced from fifteen minutes to one minute. Tests have shown that fast cooling of the molten sulphur renders the crystalline structure of the sulphur more homogeneous.

In Fig. 1 of the drawing there is diagrammatically shown an infra-red detector element according to this invention. The element preferably comprises a doped germanium body 10 to which lead wires 11 are connected through electrodes 12. In accordance with this invention, the element is completely enclosed by a coating 13 consisting principally of sulphur as hereinbefore described.

In addition to sulphur encapsulation of the infra-red detector element by itself, the present invention contemplates the inclusion within the same encapsulation of at least one transistor amplifier whenever desired. It is characteristic of an infra-red detector element that its output impedance is rather high (on the order of 5–10 megohms). This makes necessary the use of short interconnection leads between the detector element and the first amplifier. If the first amplifier is encapsulated along with the detector element, the short lead requirement is readily met. If the first amplifier is a transistor operating at liquid nitrogen temperature, it will be found that the input impedance of the transistor, when operated in a common emitter circuit, will be increased drastically. In addition to this, the internal noise generated by the transistor is reduced because some of the noise components are temperature sensitive.

By way of demonstration, a 2N49 transistor was connected into a common emitter circuit, with the transistor mounted on a holder so that it could be submerged to a depth of about four inches in liquid nitrogen. At room temperature, the input resistance of the transistor was of the order of hundreds of ohms. At liquid nitrogen temperature, the input resistance of the transistor increased greatly to a value within the range of two to three megohms, this value being in the vicinity of the detector element impedance level. With a 27,000 ohm load resistor, the gain of the circuit was slightly in excess of 2, indicating that the gain at low temperature is considerably lower than it is at room temperature. However, since the output impedance of the circuit is approximately 27,000 ohms, it can be seen that considerable power gain is achieved. The improvement in signal transfer due to the transistor more than offsets the noise contribution of the transistor to the circuit.

Fig. 2 shows the encapsulation of both an infra-red detector element 14 and a transistor amplifier 15 according to this invention. Leads 16 and 17 extend to the emitter and base respectively of the transistor. The output leads 18 and 19 are connected to the emitter and the collector of the transistor. The assembly is shown embedded within the sulphur coating 20 within a Kovar cup 21 having an infra-red transparent window 22.

The preceding description is equally applicable to Fig. 2. After assembly and interconnection of the detector element and the transistor amplifier in close proximity to one another, the coating 16 may be applied to the combination in any suitable manner as hereinbefore described. The coating may consist of pure sulphur or a mixture of sulphur and an additive to increase the thermal conductivity. In the case of pure sulphur, heat treatment may be utilized to increase the thermal conductivity.

While certain embodiments of the invention have been illustrated and described, it will be understood that the invention is not limited thereto but contemplates such modifications and further embodiments as may occur to those skilled in the art.

We claim:

1. An infra-red detector, comprising a doped semiconductor body which is electrically responsive when exposed to infra-red radiation, conductors electrically and mechanically connected to said body, and a coating consisting principally of sulphur completely enclosing said body.

2. An infra-red detector according to claim 1, wherein said coating consists solely of sulphur.

3. An infra-red detector according to claim 1, wherein said coating consists of sulphur and an additive which has high thermal conductivity and is inactive toward the semiconductor body.

4. An infra-red detector according to claim 3, wherein said additive is boron carbide.

5. An infra-red detector according to claim 1, wherein said semiconductor body comprises germanium.

6. An infra-red detector, comprising a doped semiconductor body which is electrically responsive when exposed to infra-red radiation, conductors electrically and mechanically connected to said body, and a coating consisting principally of sulphur completely enclosing said body and the portions of said conductors in the immediate vicinity thereof.

7. A method of making an infra-red detector, which comprises fabricating a detector element having a doped semiconductor body which is electrically responsive when exposed to infra-red radiation, etching said element to condition the surface thereof, washing said element, rinsing said element in carbon tetrachloride, and immediately thereafter coating the element with a material consisting principally of sulphur.

8. A method of making an infra-red detector, which comprises fabricating a detector element having a doped semiconductor body which is electrically responsive when exposed to infra-red radiation, coating said element with pure sulphur, and heating the coated element at a temperature lower than 95.5° C. for a time sufficient to produce rhombic structure of the sulphur.

9. A combined photodetector-amplifier unit, comprising an infra-red detector element, a transistor in close proximity to said detector element, electrical conductors interconnecting said retector element and said transistor, and a coating consisting principally of sulphur completely enclosing said detector element, said transistor and said conductors, and output electrical conductors connected to said transistor and extending through said coating to the exterior thereof.

10. A combined unit according to claim 9, wherein said detector element includes a doped germanium body.

11. A method of making an infra-red detector, which comprises fabricating a detector element having a doped semiconductor body which is electrically responsive when exposed to infra-red radiation, and encapsulating said element within a material consisting principally of sulphur.

12. A method of making an infra-red detector, which comprises fabricating a detector element having a doped semiconductor body which is electrically responsive when exposed to infra-red radiation and having conductors electrically and mechanically connected to said body, and encapsulating said body and the connected portions of said conductors within a material consisting principally of sulphur.

References Cited in the file of this patent

UNITED STATES PATENTS

| | | |
|---|---|---|
| 2,683,767 | Cunningham | July 13, 1954 |
| 2,758,261 | Armstrong | Aug. 7, 1956 |
| 2,768,100 | Rulison | Oct. 23, 1956 |
| 2,806,929 | Langevin | Sept. 17, 1957 |

OTHER REFERENCES

"Photo Conductivity in the Elements," T. S. Moss, published by Academic Press, Inc., New York, 1952; pages 180–184 inclusive (Chap. 19) relied on.

"Electronics," vol. 30, No. 7, July 1, 1957, pp. 190–191.